United States Patent
O'Hara, Jr. et al.

(10) Patent No.: US 7,340,247 B1
(45) Date of Patent: Mar. 4, 2008

(54) WIRELESS NETWORK INFRASTRUCTURE INCLUDING WIRELESS DISCOVERY AND COMMUNICATION MECHANISM

(75) Inventors: Robert B. O'Hara, Jr., Santa Clara, CA (US); Robert J. Friday, Los Gatos, CA (US); Patrice R. Calhoun, Pleasanton, CA (US); Paul F. Dietrich, Seattle, WA (US)

(73) Assignee: Airespace, Inc., San Jose, CA (US)

( * ) Notice: Subject to any disclaimer, the term of this patent is extended or adjusted under 35 U.S.C. 154(b) by 822 days.

(21) Appl. No.: 10/447,735

(22) Filed: May 29, 2003

(51) Int. Cl.
*H04M 3/00* (2006.01)

(52) U.S. Cl. .................. 455/418; 370/338; 370/349

(58) Field of Classification Search .............. 455/418; 370/338, 349
See application file for complete search history.

(56) References Cited

U.S. PATENT DOCUMENTS

| | | | |
|---|---|---|---|
| 5,491,692 A | 2/1996 | Gunner et al. | |
| 5,684,860 A | 11/1997 | Milani et al. | |
| 6,208,629 B1 * | 3/2001 | Jaszewski et al. | 370/329 |
| 6,286,038 B1 * | 9/2001 | Reichmeyer et al. | 709/220 |
| 6,760,318 B1 | 7/2004 | Bims | |
| 6,788,658 B1 | 9/2004 | Bims | |
| 6,917,819 B2 | 7/2005 | Collins | |
| 6,925,070 B2 | 8/2005 | Proctor, Jr. | |
| 2002/0188723 A1 | 12/2002 | Choi et al. | |
| 2002/0194384 A1 * | 12/2002 | Habetha | 709/249 |
| 2003/0023746 A1 | 1/2003 | Loguinov | |
| 2003/0188006 A1 | 10/2003 | Bard | |
| 2003/0198208 A1 | 10/2003 | Koos, Jr. et al. | |
| 2003/0224787 A1 * | 12/2003 | Gandolfo | 455/434 |
| 2004/0111607 A1 | 6/2004 | Yellepeddy | |

OTHER PUBLICATIONS

International Standard, ISO/IEC 8802-11 ANSI/IEEE Std. 802.11, 1999 Edition, Part II: Wirelss LAN Medium Access Control (MAC) and Physical Layer (PHY) specifications, pp. 122-137.
"tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

*Primary Examiner*—Lester G. Kincaid
*Assistant Examiner*—Charles Shedrick
(74) *Attorney, Agent, or Firm*—Mark J. Spolyar

(57) ABSTRACT

A wireless discovery and communication mechanism to facilitate configuration, management and performance tasks associated with wireless network environments. In certain embodiments, access elements transmit and receive neighbor messages on a periodic basis to neighboring access elements. The neighbor messages can include configuration and/or protocol information to allow the access elements or associated devices to discover each other over the air. The present invention can be applied to a variety of wireless network architectures, such as a plurality of distributed, substantially autonomous access points, or to a hierarchical wireless network system comprising central control elements, each supervising and controlling one or more access elements as described more fully below.

34 Claims, 4 Drawing Sheets

WIRELESS NETWORK INFRASTRUCTURE INCLUDING WIRELESS DISCOVERY AND COMMUNICATION MECHANISM

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN," and U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to methods, apparatuses and systems implementing wireless discovery and communication mechanisms to facilitate configuration, management and performance tasks associated with wireless network environments.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments become critical to performance and security. Heretofore, it has not been recognized how important visibility into all layers of the network protocol is to optimization of network manageability and user performance in wireless LANs (WLANs). Unlike centrally-managed cellular wireless systems, known WLAN solutions use distributed access points to act as bridges between the wired infrastructure and the wireless clients, removing all physical and wireless media access protocol information from the protocol frames that are passed onto the infrastructure network. This results in uncoordinated handoffs of wireless clients moving between access points. An uncoordinated system of access points makes it difficult to manage a large number of access points, because there is no point of coordination. For example, known prior art wireless network systems such as conventional 802.11 systems provide the initial handshaking, access authentication and access association at a remote node without attention to overall network loading and signal quality.

This type of distributed architecture creates many problems affecting network management, mobility, and performance. Since each wireless LAN access point is a separate managed device, distributed architecture in general introduces many new managed elements in the network without sufficient attention to their global effects. Since the access points act in their own self-interest and are not aware of the actions taken by surrounding access points, they handle mobility (e.g., handoff actions) as a local event, which significantly increases latency. U.S. application Ser. No. 10/155,938, identified above, discloses a hierarchical wireless network architecture that optimizes network management and performance of a relatively autonomously-managed WLAN. According to the system architecture, a central control element manages and controls one more access elements. These light-weight access elements perform real-time communication functions, such as data transfer and acknowledgements, while the central control element manages the connection between the access element and one or more wireless client devices.

Configuration and management of wireless network systems incorporating many managed access points can be complicated and time consuming. For example, configuration of the access elements and/or central control elements in the hierarchical wireless network architecture disclosed above can be complicated and/or time consuming, especially where large number of access elements and central control elements are deployed. In wireless network environments, it is desirable for the operation of access elements to be coordinated to enhance the performance of the network. For example, in the wireless network environment disclosed in U.S. application Ser. No. 10/155,938, hand-offs require the cooperation of two central control elements. In traditional networks, hand-offs require the cooperation of two autonomous access points. Accordingly, discovery of neighboring devices is critical to this goal. Conventional network devices typically support a variety of layer 2 or 3 discovery mechanism that allow for discovery of devices over wired networks for tasks such as automatically locating and associating with a central management device upon initialization. However, many discovery mechanisms do not work across Local Area Networks or different LAN segments without being configured with higher-layer addresses. This can be problematic to the coordinated operation of two neighboring access elements connected to two different LAN segments. The prior art technologies would require network administrators to manually configure the two elements to allow for coordinated operation.

Accordingly, a need in the art exists for methods, apparatuses and systems that facilitate the deployment, configuration and management of managed access elements, such as autonomous access points in conventional wireless networks or access elements in hierarchical wireless network systems. Embodiments of the present invention substantially fulfill this need.

SUMMARY OF THE INVENTION

The present invention provides methods, apparatuses and systems implementing wireless discovery and communication mechanisms to facilitate configuration, management and performance tasks associated with wireless network environments. In certain embodiments, access elements transmit and receive neighbor messages on a periodic basis to neighboring access elements. The neighbor messages can include configuration and/or protocol information to allow the access elements or associated devices to discover each other over the air. The present invention can be applied to a variety of wireless network architectures, such as a plurality of distributed, substantially autonomous access points, or to a hierarchical wireless network system comprising central control elements, each supervising and controlling one or more access elements as described more fully below.

DESCRIPTION OF PREFERRED EMBODIMENT(S)

For didactic purposes an embodiment of the present invention is described as operating in a WLAN environment as disclosed in U.S. application Ser. Nos. 10/155,938 and 10/407,357 incorporated by reference herein. As discussed below, however, the present invention can be implemented according to a vast array of embodiments, and can be applied to a variety of WLAN architectures.

Figure 1:
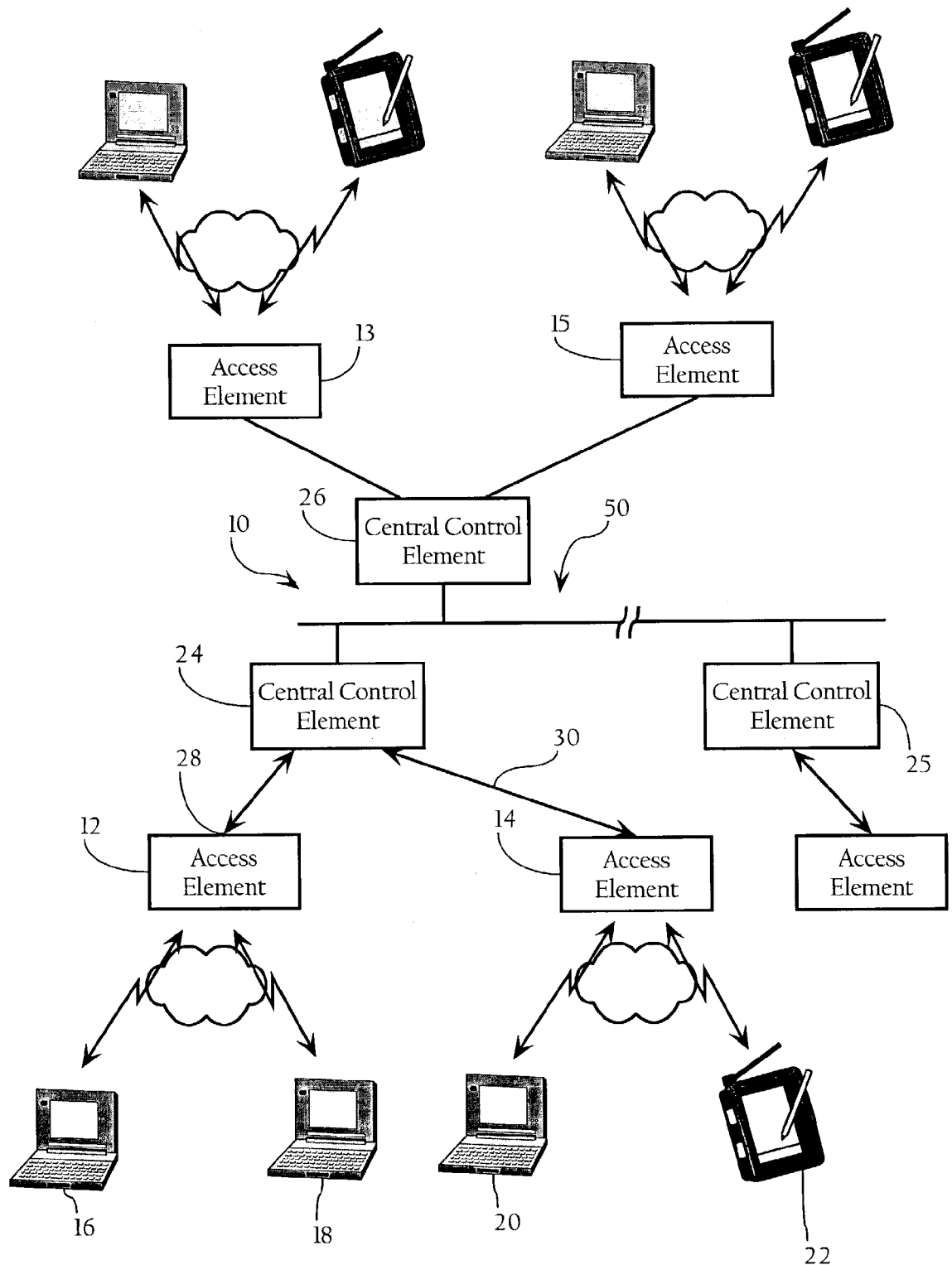
FIG. 1 is a functional block diagram illustrating a wireless network system according to an embodiment of the present invention.
Figure 4:
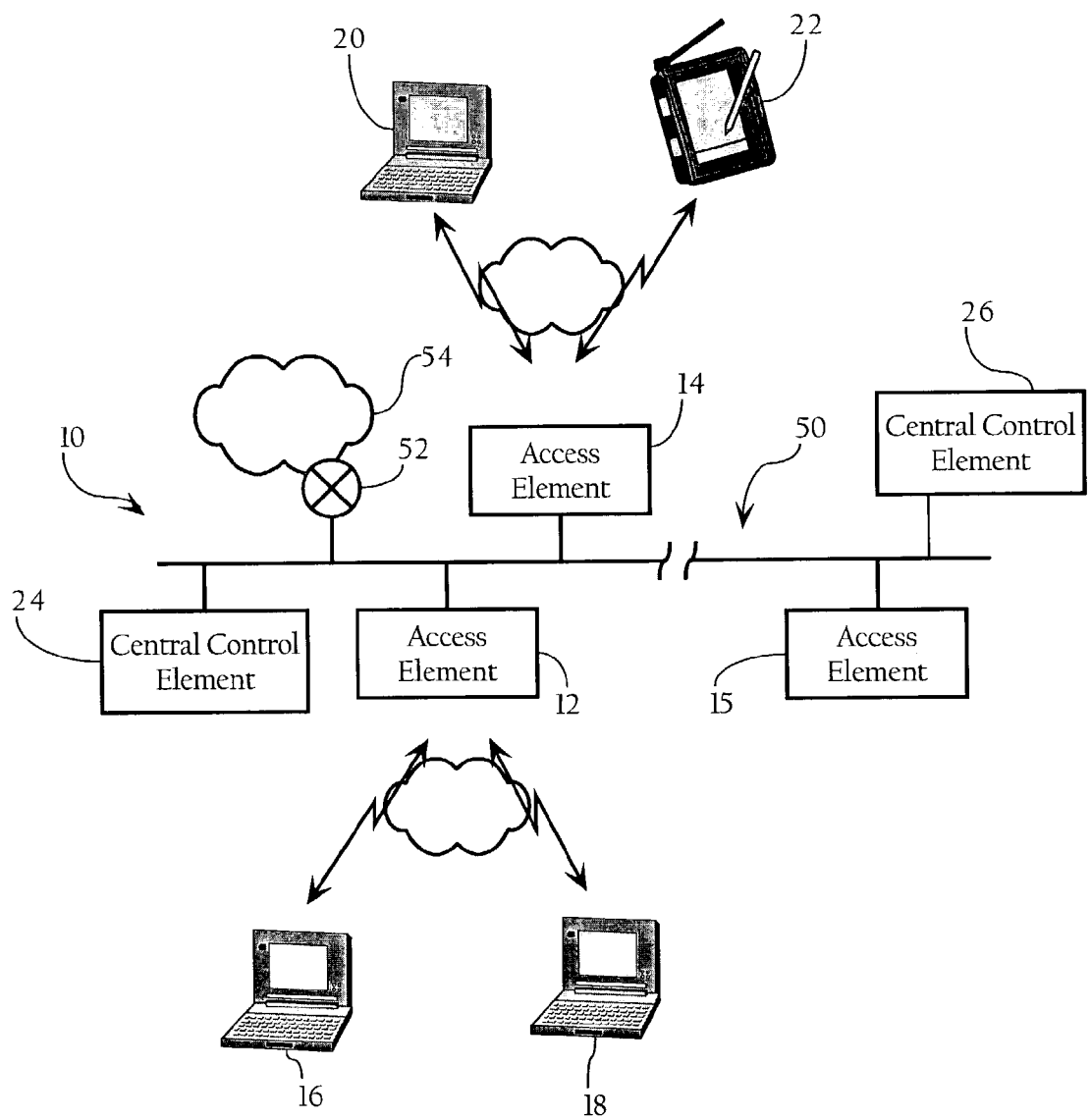
FIG. 4 is a functional block diagram illustrating an alternative wireless network system architecture.

FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with selected client remote elements 16, 18, 20, 22 central control elements 24, 25, 26, and means for communication between the access elements and the central control elements, typically direct line access 28, 30, but potentially a wireless backbone, fiber or other reliable link. As disclosed in U.S. patent application Ser. No. 10/407,357, in another embodiment, the access elements, such as access elements 12, 14 are directly connected to LAN 10 or a virtual local area network (VLAN) for communication with a corresponding central control element 24, 26. See FIG. 4.

The access elements 12-15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

In one embodiment, the access elements, such as access elements 12, 14, include functionality allowing for detection of the strength of the signal received from client remote elements and/or other access elements. For example, the IEEE 802.11 standard defines a mechanism by which RF energy is measured by the circuitry (e.g., chip set) on a wireless network adapter or interface card. The 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). The numerical value is typically an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. Again, many chip sets include functionality and corresponding APIs to allow for a determination of SNRs associated with packets received from client remote elements. In one embodiment, access elements 12, 14 include the detected signal strength and/or SNR value associated with a packet the encapsulating headers used to tunnel the wireless packets to central control element 24.

As described in the above-identified patent application, central control element 24 operates to perform data link layer management functions, such as authentication and association on behalf of access elements 12, 14. For example, the central control element 24 provides processing to dynamically configure a wireless Local Area Network of a system according to the invention while the access elements 12, 14 provide the acknowledgement of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgement of the communication of these messages without conventional processing thereof. Similarly, the central control element 24 may for example process physical layer information. Still further, the central control element 24 may for example process information collected at the access elements 12, 14 on channel characteristic, propagation, and interference or noise. Central control elements 25, 26 and associated access elements 13, 15 operate in a similar or identical manner. Other system architectures are possible. For example, U.S. application Ser. No. 10/407,357 discloses a system architecture where the access elements, such as access elements 12-15, are directly connected to LAN segment 10.

As discussed herein, the access elements 12-15 each transmit neighbor messages (e.g., packets or frames) containing network configuration and/or management information to neighboring access elements to facilitate management and configuration tasks associated with the wireless network environment. The access elements, in one embodiment, transmit the neighbor messages over all available frequency channels in a sequential manner. Accordingly, any access element, operating on a given channel, within range will eventually receive the neighboring message. Access elements that receive the neighbor messages, in one embodiment, tunnel the messages to their corresponding central control elements for processing.

Figure 2:
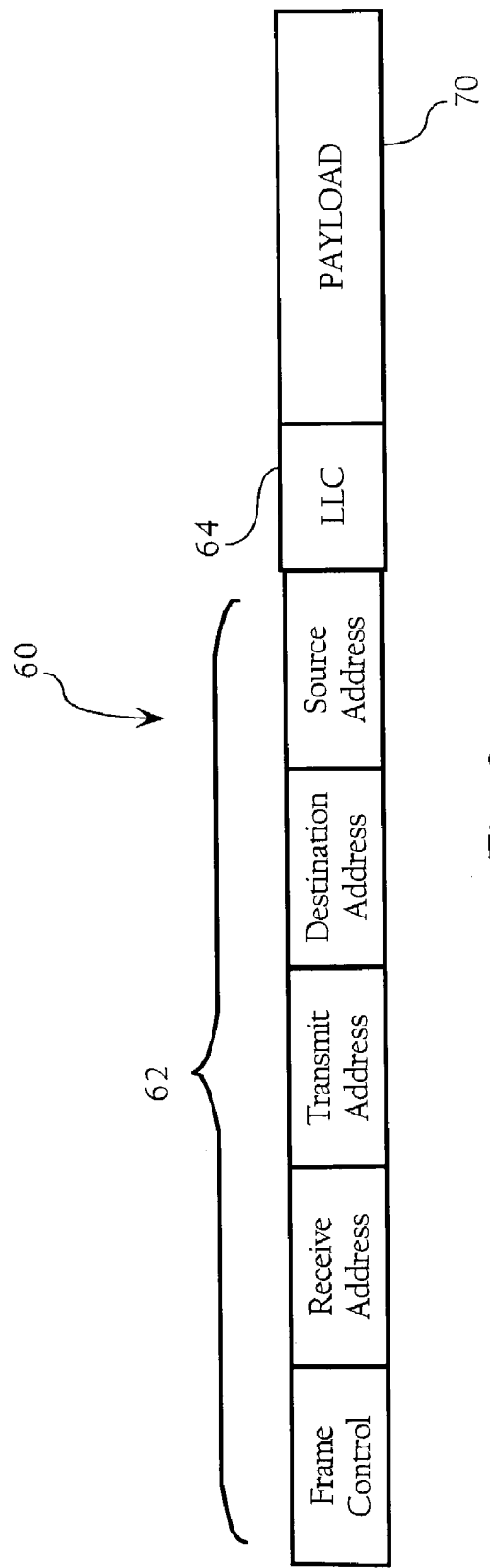
FIG. 2 is a diagram illustrating the frame layout of a neighbor message according to an embodiment of the present invention.

In one embodiment, a neighbor message is a single wireless data link layer frame; however, in other embodiments, a neighbor message may span several wireless data link layer frames. FIG. 2 is a diagram illustrating the frame layout, according to an embodiment of the present invention, for a wireless neighbor message transmitted between access elements. In wireless network environments employing 802.11 protocols, the neighbor message 60 is an 802.11 frame comprising an 802.11 wireless distribution system mode header, a snap Logical Link Control (LLC) header 64, and a payload 70. For descriptive purposes, the frame layout diagram of FIG. 2 omits certain header fields, such as the Sequence and FCS fields that are not relevant to certain embodiments of the invention. In addition, those skilled in the art will recognize that other wireless link layer protocols may necessitate different frame layouts. As discussed above, the neighbor message 60, in one embodiment, is an 802.11 data frame including a wireless distribution system mode header 62 (i.e., where the "From DS" and "To DS" bits are both set to "1" in the frame control byte). In one embodiment, the receive address (RA) and the destination address (RA) are set to a multicast type address (e.g., the multicast bit is set) where the first three octets are the Organizationally Unique Identifier (OUI) associated with the manufacturer of the access element, followed by all zeros in the remaining three octets. For example, the receive and destination addresses may be set to 01:0b:85:00:00:00, where 00:0b:85 is the OUI associated with the access element. The transmitter address (TA) and the source address (SA) fields, in one embodiment, are set to the Basic Service Set Identifier (BSSID) of the transmitting access element. Other addressing schemes are possible depending on the configuration of the access elements, such as access elements presenting more than one WLAN MAC address. The Logical Link Control snap header 64, in one embodiment, includes a payload type identifier field which, for neighbor messages, is set to a value identifying a neighbor message. In one embodiment, the payload type identifier is a 1-byte value. The payload type identifier allows receiving access elements configured to recognize neighbor messages to identify them for processing as neighbor messages, as opposed to regular 802.11 data or management frames. Other access elements or central control elements not configured to recognize the neighbor messages can simply discard them.

The payload 70 of the neighbor message 60 can include a variety of data fields depending on desired objectives. The neighbor message payload 70, in one embodiment, includes 1) the LAN MAC address of the central control element, such as central control element 24, to which the transmitting access element is associated, and 2) the IP address of the central control element. In certain embodiments, the neighbor message payload may include other fields, such as 3) a 1-byte channel field (indicating the current transmit channel), 4) a 1-byte power field (indicating current transmit power), and 4) a 1-byte antenna field (indicating antenna type). The neighbor message payload may further include security data, such as a digital signature or authentication key, which allows for verification that the neighbor message came from an authorized access element. Digital signatures and authentication technologies are known in the art. Accordingly, one skilled in the art will be able to implement various authentication schemes allowing for verification of neighbor messages. The neighbor message payload 70 may contain yet other fields, such as a group identifier indicating the group of access elements to which the transmitting access element has been assigned for administrative purposes (e.g., configuration and other tasks such as hand-offs of wireless clients between access elements). For example, administrative groups may comprise one or more central control elements and associated access elements, where one of the central control elements (a "group leader") performs various configuration tasks for the group, such as coordination of channel assignments, transmit power levels, and the like. In one embodiment, the neighbor message payload may further include the MAC and IP addresses of the group leader.

As discussed above, receiving access elements are configured to recognize and accept neighbor messages. In one embodiment, a receiving access element encapsulates received neighbor messages in Ethernet or other suitable headers and transmits them to a central control element for processing, as described in U.S. application Ser. No. 10/155,938. In one embodiment, the receiving access element includes the signal strength detected during receipt of the neighbor message, and sets a neighbor message flag, in the encapsulating header.

The central control element 24 receives encapsulated WLAN protocol frames from the access elements, strips the Ethernet encapsulation from the frame, processes the neighbor message and the encapsulated information. In one embodiment, the central control elements are configured to recognize neighbor messages, in part, by checking the neighbor message flag in the encapsulating header. The information in the neighbor message payload facilitates a variety of management and configuration tasks. For example, the MAC and IP addresses of the central control element contained in the message header allow central control element 26, for example, to discover information about central control element 24 over the air. In one embodiment, this is especially useful where central control elements 24 and 26 are connected to different LAN segments, where standard layer 2 or 3 discovery mechanisms over a wired network cannot be employed. In the embodiment described above, however, central control element 26 can wirelessly discover the LAN MAC and IP addresses of central control element 24 through an associated access element and use this information for a variety of tasks. For example, the central control elements can exchange protocol or configuration information over the wired network to coordinate a variety of functions (e.g., hand-offs between access elements) or attempt to join as an administrative group for configuration purposes (e.g., adjusting transmit power of access elements, channel assignments, etc.). In addition, a given central control element can use the information contained in neighbor message packets transmitted and received by the access elements under its supervision as a mechanism to monitor transmit power or coverage levels.

As one skilled in the art will recognize, the wireless discovery mechanism can be used to achieve a vast array of objectives. In yet other embodiments, a newly installed access element in a wide-area network deployment, as disclosed in U.S. application Ser. No. 10/407,357, may wirelessly discover a neighboring, previously installed access element and receive configuration information, such as the IP address of a central control element. With knowledge of this IP address, the newly installed access element can communicate and register with the central control element and receive configuration information.

Figure 3:
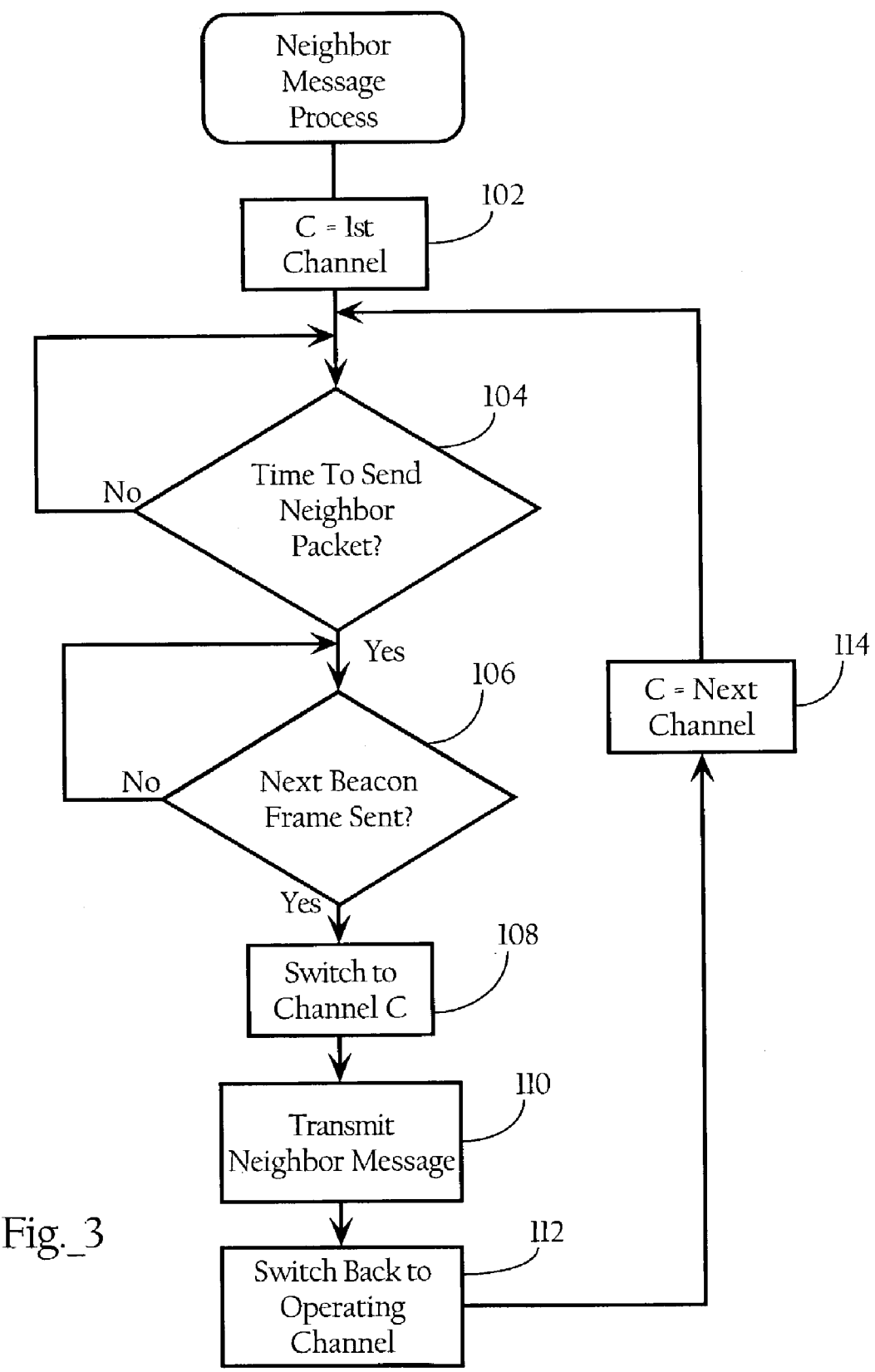
FIG. 3 is a flow chart diagram providing a method directed to transmitting wireless neighbor messages.

In one embodiment, the access elements transmit neighbor messages in synchronization with beacon frames transmitted according to the 802.11 protocols. In 802.11 network environments, some wireless stations are quite sensitive to interruptions in receiving beacon packets, which typically are transmitted 10 times every second. Accordingly, the access elements, in one embodiment, are configured such that transmission of neighbor messages does not interrupt certain data link layer management functionality. FIG. 3 illustrates a method, according to an embodiment of the present invention, directed to the transmission of neighbor messages. Upon initialization of the access element or the neighbor message process, the transmission channel, C, is set to the first channel (102). As block 104 illustrates, the process, in one embodiment, transmits neighbor messages at periodic intervals. In one embodiment, the process is configured such that a neighbor message is transmitted on every available operating channel (or a configurable subset of operating channels) within a 1-minute (or other configurable) period. In the embodiment shown, the process waits until it is time to send a neighbor message (104). At this interval, a daemon, in one embodiment, is invoked to monitor the data link layer processes of the access element and to detect the transmission of a beacon frame (106). When transmission of a beacon frame occurs, the daemon switches the transmission channel to channel C (108), causes the access element to transmit the neighbor message (110), and switches the transmission channel to the original operating channel (112). During the transmission of neighbor messages, the access elements can either just disappear (from the perspective of the remote client elements) for the transmission period, or use the mechanisms in 802.11 for "contention-free periods" to halt the transmissions of the mobile stations before going off channel to transmit the neighbor message. As FIG. 3 shows, the channel parameter is incremented (114) and the process waits until it is time to send another neighbor message.

The invention has been explained with reference to specific embodiments. Other embodiments will be evident to those of ordinary skill in the art. For example, the present invention can also be applied to WLAN architectures beyond the hierarchical WLAN architecture described above. For example, in another embodiment, the wireless discovery functionality described herein can be implemented within the context of a single, autonomous access point, which can be configured to exchange neighbor messages with other similarly configured access points and communicate with such access points over the wired network to coordinate configuration and other management tasks. This distributed system of autonomous access points can be managed by a central network management platform operative to distribute configuration information to the access points. In such an embodiment, the neighbor messages can contain the IP or other computer network address of the central network management platform to allow newly installed access points to learn the network address and register with the central management platform. It is, therefore, intended that the claims set forth below not be limited to the embodiments described above.

What is claimed is:

1. A wireless network system, comprising a plurality of access elements for communication with at least one remote client element and for communication with a central control element; a first central control element supervising at least one of said access elements, wherein the first central control element manages and controls the wireless connections between the access elements and corresponding remote client elements; and a second central control element supervising at least one other of said access elements; wherein each access element is configured to: transmit wireless neighbor messages, wherein the wireless neighbor messages identify a network address of a central control element supervising the access element; receive wireless neighbor messages from neighboring access elements, wherein the received wireless neighbor messages identify network addresses of respective central control elements supervising the neighboring access elements; provide received wireless neighbor messages to a supervising central control element associated with the access element; and wherein the first and second central control elements are each configured to establish respective tunnels over a computer network with access elements for transmission of wireless traffic, associated with corresponding remote client elements with encapsulation headers; bridge network traffic between the computer network and a remote client element through a tunnel with a corresponding access element; perform data link layer management functions on wireless traffic corresponding to the remote client elements; and discover each other's respective network address by processing the wireless neighbor messages received from associated access elements.

2. The system of claim 1 wherein the wireless neighbor messages each include information associated with transmitting access elements.

3. The system of claim 1 wherein the wireless neighbor messages each include configuration information associated with transmitting access elements.

4. The system of claim 1 wherein the first and second central control elements are each operative to discover each other over a wired network using the network addresses received in wireless neighbor messages.

5. The system of claim 1 wherein the access elements are operative to encapsulate wireless neighbor messages with headers and transmit the encapsulated neighbor messages to corresponding central control elements.

6. The system of claim 5 wherein the access elements are further operative to
   detect the strength of the signals associated with wireless neighbor messages;
   include indicators of the detected signal strengths in the headers encapsulating the wireless neighbor messages.

7. The system of claim 1 wherein the wireless neighbor messages are each single data link layer frames.

8. The system of claim 7 wherein the wireless neighbor messages include a wireless distribution system mode header.

9. The system of claim 1 wherein the access elements are each operative to
   coordinate transmission of wireless neighbor messages with wireless data link layer functionality associated with the access elements.

10. The system of claim 9 wherein the access elements are each operative to
    coordinate transmission of wireless neighbor messages with the transmission of beacon frames.

11. The system of claim 1 wherein the access elements are each operative to
    transmit wireless neighbor messages on one to a plurality of operating channels.

12. The system of claim 1 wherein the access elements are operative to encapsulate and transmit using a tunnel detected wireless neighbor messages to corresponding central control elements.

13. The system of claim 1 wherein the access elements are each connected to the central control element via a direct access line.

14. The system of claim 1 wherein the access elements are each operably coupled to the computer network.

15. The system of claim 13 wherein the computer network is a local area computer network.

16. The system of claim 13 wherein the computer network is a virtual local area computer network.

17. The system of claim 1 wherein the tunnel is a data link layer tunnel.

18. The system of claim 1 wherein the tunnel is a network layer tunnel.

19. The system of claim 1 wherein the computer network is a local area network.

20. The system of claim 1 wherein the computer network is a virtual local area computer network.

21. The system of claim 1 wherein the computer network is a wide area computer network.

22. The system of claim 19 wherein the central control element is coupled to a second local area network, and the access elements and the central control element communicate over a global network operative to route data between the first and second local area networks.

23. An apparatus for use in a wireless network environment,

Comprising

A transmit/receive unit communicating wireless communication with at least one remote client element, a network interface for communicating with a central control element, Wherein the apparatus is configured to:

Establish and maintain: in an access point mode, wireless connections with remote client elements to bridge wireless traffic between the remote client elements and the computer network;

Acknowledge wireless frames transmitted by the remote client elements; transmit the received wireless frames with encapsulating headers to the central control element for processing;

Transmit beacon frames at regular intervals; switch to a neighbor message mode at periodic intervals to transmit wireless neighbor messages, wherein the wireless neighbor messages, wherein the wireless neighbor messages are scheduled for transmission after respective beacon frames, wherein the wireless neighbor messages each identify a network address of the central control element, receive wireless neighbor messages from neighboring wireless access devices, process received wireless neighbor messages; and encapsulate the received wireless neighbor messages with tunnel headers and transmit the encapsulated wireless neighbor messages to a central control element.

24. The apparatus of claim 23 wherein the apparatus is operative to transmit the wireless neighbor messages on all available operating channels.

25. The apparatus of claim 24 wherein a single wireless neighbor message is transmitted over a given available operating channel at each of said periodic intervals.

26. The apparatus of claim 25 wherein the apparatus comprises a daemon, invoked at the periodic intervals, operative to: monitor operation of the transmit/receive unit to coordinate transmission of neighbor wireless messages with operation of the transmit/receive unit.

27. The apparatus of claim 26 wherein the daemon is operative to coordinate transmission of neighbor messages so as to not interfere with transmission of the beacon frames.

28. The apparatus of claim 23 wherein the beacon frames announce contention free periods, during which respective wireless neighbor messages are transmitted.

29. The apparatus of claim 23 wherein the wireless neighbor messages each include information associated with the transmitting apparatus.

30. The apparatus of claim 23 wherein the wireless neighbor messages each include configuration information associated with the transmitting apparatus.

31. The apparatus of claim 29 wherein the apparatus is further operative to discover other transmitting apparatuses over a wired network using the configuration information received in wireless neighbor messages.

32. The apparatus of claim 23 wherein the apparatus is further operative to detect the strength of the signals associated with wireless neighbor messages; and include indicators of the detected signal strengths in the headers encapsulating the wireless neighbor messages.

33. The apparatus of claim 23 wherein the wireless neighbor messages are each single data link layer frames.

34. The apparatus of claim 33 wherein the wireless neighbor messages include a wireless distribution system mode header.

* * * * *